United States Patent [19]

Caporiccio et al.

[11] Patent Number: 5,446,214
[45] Date of Patent: Aug. 29, 1995

[54] COTELOMERS AND A PROCESS FOR MAKING THEM

[75] Inventors: Gerardo Caporiccio, Milan, Italy; Richard D. Chambers, Durham, United Kingdom; Lee D. Proctor, Moscow, Id.

[73] Assignee: Dow Corning Corporation, Midland, Mich.

[21] Appl. No.: 329,935

[22] Filed: Oct. 27, 1994

[30] Foreign Application Priority Data

Oct. 29, 1993 [GB] United Kingdom ............... 9322366

[51] Int. Cl.⁶ ............... C07C 17/269; C07C 17/273; C07C 19/075
[52] U.S. Cl. ............................ 570/125; 204/158.11; 570/137; 570/139
[58] Field of Search ............ 570/139, 137, 125; 204/158.11

[56] References Cited

U.S. PATENT DOCUMENTS

| 2,856,440 | 10/1958 | Wolf | 260/653 |
|---|---|---|---|
| 2,875,253 | 2/1959 | Barnhart | 570/139 |
| 4,501,869 | 2/1985 | Tatemoto | 526/249 |
| 4,745,165 | 6/1988 | Arcella | 526/247 |
| 4,810,765 | 3/1989 | Modena | 526/249 |
| 5,110,973 | 5/1992 | Caporiccio | 556/488 |
| 5,196,614 | 3/1993 | Caporiccio | 570/137 |

FOREIGN PATENT DOCUMENTS 200908 12/1986 European Pat. Off. .

OTHER PUBLICATIONS

J. Fluorine Chem 40 (2-3), 261-282, 1988; G. C. Apsey, et al. Model Compounds Related to Hexafluoropropene-Vinylidene.

J. Am. Chem. Soc., Thermal Synthesis of Telomers of Fluorinated Olefins by Hauptschein, Braid and Fainberg (1957), vol. 80.

Polymer, 1986, vo. 27, Jun. pp. 905-909, Glass Transition Temperatures of copolymer and Terpolymer Fluoroelastomers.

J. A. Chem. Soc., Thermal Synthesis of Telomers of Fluorinated Olefins. I. Perfluoropropene by Hauptschein (1957), vol. 79.

Primary Examiner—Joseph E. Evans
Attorney, Agent, or Firm—Alexander Weitz

[57] ABSTRACT

A cotelomer of —$CH_2CF_2$— (VDF) units and $CF_2CF(CF_3)$— (HFP) units characterized in that the HEP units comprise at least 33% of all VDF and HFP units in the cotelomer combined. Also claimed is a process for preparing a cotelomer in the liquid state comprising reacting (A) a bromine geminal telogen having the general formula $RC(R')Br_2$ wherein R and R' are selected from the group consisting of F and perfluorinated alkyl radicals having 1 to 8 carbon atoms; (B) 1,1-difluoroethene, and (C) hexafluoropropene, the molar ratio of said components (A):(B):(C) being x:1:1 to x:1:5, in which x is 1 to 5.

14 Claims, No Drawings

COTELOMERS AND A PROCESS FOR MAKING THEM

The present invention relates to cotelomers of vinylidene fluoride and hexafluoropropene. More particularly the invention relates to cotelomers having a high hexafluoropropene content and prepared by reacting the above mentioned flouroolefin monomers with specific telogens having geminal bromine radicals.

Telomerization of 1,1-difluoroethene, herein also referred to as vinylidene fluoride (VDF), using various telogens is well known. However, the corresponding telomerization of hexafluoropropene (HFP) is quite difficult. Moreover, cotelomerization of HFP with other more reactive fluoroolefins, such as $CH_2=CF_2$ (VDF), $CF_2=CFCl$, $CF_2=CFH$ or $CF_2=CF_2$, results in very low proportions of HFP units in the final cotelomers. Thus, for example, few units of HFP are found in the product when this latter monomer is reacted with one of the aforementioned fluoroolefins using a telogen selected from such structures as $CF_3CFClI$; $Rf-CR'FI$, in which Rf is F, $CF_3$ or a fluoroalkyl radical having from 1 to 14 carbons and R' is Rf or Cl; $I(C_2F_2)nI$, in which n=1 to 4; or a telechelic telogen of the formula $(C_2F_4)(CF_2-CFR''I)$ in which R'' is $CF_3$ or Cl.

In U.S. Pat. No. 4,810,765 there have been disclosed cotelomers of vinylidene fluoride with fluorinated olefins having the general formula $R-(CF_2CH_2)_n(C_3F_6)_m(C_2F_4)_p(C_2F_3Cl)_q-Br$ the units with n, m, p, q indices being randomly distributed along the telomer chain, R denoting a linear or branched $C_{1-20}$ alkyl group, optionally containing halogen, esters or ether groups and wherein n is an integer from 1 to 30, m from 0 to 10, p and q from 0 to 20 provided m+p+q is at least 1. The examples of U.S. Pat. No. 4,810,765 do not, however, show a cotelomer of VDF and HFP which contains a mole % of HFP units greater than 26.6% based on the number of VDF and HFP units (see e.g. Example 5). There is a continuing need to provide cotelomers of VDF and HFP units wherein higher proportions of HFP units are present. Such a cotelomer which contains a high proportion of HFP units is desirable since this unit imparts structural disorder to the molecule, thereby reducing its tendency to crystalize and allowing its use in low temperature applications.

It has now been surprisingly found that cotelomers of HFP arid VDF containing a high proportion of HFP units can be prepared by cotelomerizing these two monomers using certain bromine geminal telogens employed in particular molar ratios of telogen:VDF:HFP. Cotelomers containing at least 33 mole percent HFP units can thus be obtained. The reactants may be exposed to gamma radiation or heat, with or without the further addition of a free-radical initiator.

The present invention therefore provides a cotelomer of $-C_2CF_2-$ (HFP) units and $-CF_2-CF(CF_3)-$ (HFP) units wherein the VDF units comprise at least 33% of all VDF and HFP units combined.

The present invention provides in another of its aspects a process for preparing a cotelomer by reacting in a liquid state, (A) a bromine geminal telogen having the general formula $RC(R')Br_2$ wherein R and R' are selected from the group consisting of F and perfluorinated alkyl radicals having 1 to 8 carbon atoms; (B) 1,1-difluoroethene, and (C) hexafluoropropene, the molar ratio of said components (A):(B):(C) being from x:1:1 to x:1:5, in which x has a value of from 1 to 5.

The bromine geminal telogen (A) to be used in a process according to the present invention is represented by the general formula

wherein each R and R' is a monovalent group selected from F and perfluorinated alkyl radicals having 1 to 8 carbon atoms. Specific examples of such telogens include compounds having the formulae $CF_2Br_2$, $CF_3CFBr_2$, $C_2F_5CFBr_2$ and $(CF_3)_2CBr_2$. These compounds can be obtained by methods known in the art and many of them are commercially available. Of these, dibromodifluoromethane and 1,1-dibromotetrafluoroethane are particularly preferred telogens for the purposes of the present invention.

Component (B) for use in a process according to the present invention is the monomer 1,1-difluoroethene (VDF) and having the structure $CH_2=CF_2$. When this monomer is cotelomerized by the instant process it forms units having the structure $-CH_2CF_2-$ and these units are referred to as VDF units herein.

Component (C) for use in a process according to the invention is the monomer hexafluoropropene (HFP) and has the structure

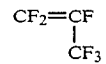

Again, when cotelomerized according to the instant process this monomer forms units having the structure

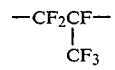

these units being referred to herein as HFP units.

Both the VDF and the HFP monomers are well known and are commercially available.

In order to prepare the cotelomers of the present invention, components (A), (B) and (C) are reacted in the liquid state such that the molar ratio of these reactants is in the range x:1:1 to x:1:5, respectively, where x has a value of 1 to 5. Preferably, x is 2 to 5, most preferably about 2. The above reaction is typically carried out in a sealed container, such as a tube or reaction bomb, but a continuous reaction process is also contemplated herein.

The reaction is promoted by radiation, heat or a free-radical initiator. For example, the telomerization may be facilitated by heating components (A) through (C) at a temperature of about 200° C. to 300° C., preferably about 200° C. to 250° C. Alternatively, an organic peroxide may be used in the instant process, the temperature of reaction now preferably being about 130° C. to 160° C. Suitable examples of a peroxide include di-t-butyl peroxide and 1,3-bis(t-butylperoxyisopropyl) benzene, inter alia. The optimum amount of organic peroxide to be used may be determined by routine experimentation and is typically in the range 0.05% to 5% based on the total weight of components (A) through (C). In a preferred embodiment of the instant process the cotelomerization reaction is promoted by gamma-rays, such as emitted by a cobalt-60 source. In this embodiment the reaction can be carried out at or near room temperature.

In each of the above described embodiments the amount of time needed for carrying out the reaction is readily determined by the skilled artisan through routine experimentation.

When the components (A) through (C) are reacted according to the process of the present invention the resulting cotelomer, which comprises VDF units and HFP units, has been found to contain at least 33% of said HFP units based on the total number of HFP units and VDF units combined. Preferably, the resulting cotelomer has an average degree of telomerization (i.e., total of VDF units and HFP units) of $\leq 10$, more preferably about 3 to 7.

It has also been found that certain solvents may be added to the above described reaction mixture. Examples of preferred solvents include $ClCF_2—CFCl_2$ (Freon® 13) and $CF_2Cl—CF_2Cl$ (Freon® 114). However, solvents such as ethers, tetrahydrofuran, carbon disulfide, acetone and various hydrocarbons are less desirable since they have been shown to reduce the HFP unit content of the resulting cotelomer.

The cotelomers of the present invention find utility in areas similar to those employing other known fluoroolefin-based telomers and cotelomers of the art. Examples include, but are not limited to, such applications as reactive intermediates, hydraulic fluids, lubricants, release coatings and ingredients for greases, inter alia.

The following examples are presented to further illustrate the composition and process according to this invention, while comparative examples show the relative inferiority of the prior art.

EXAMPLE 1

A Pyrex® Carius tube (60 ml) was evacuated, cooled at $-190°$ C. and charged with 100 mmols of $CF_2Br_2$, 50 mmols of $CH_2=CF_2$ (VDF) and 50 mmols of hexafluoropropene (HFP) which corresponded to a molar ratio of 2:1:1, respectively. The liquid reactants were added to the tube and degassed, then the gaseous reactants were transferred to the tube under vacuum. The tube was cooled in liquid air and sealed under vacuum. The tube was irradiated with gamma-rays for 5 days using a cobalt-60 source at room temperature to provide a total dose of about 10 Mrad. The Carius tube was again cooled in liquid air and opened. Unreacted telogen and monomers were recovered by vacuum transfer without any loss and 8.83 g of a colourless liquid cotelomer was recovered. This cotelomer was analyzed by $^{19}F$ NMR (235 MHz, CDCl$_3$, ppm) which showed the presence of the terminal groups a) $BrCF_2CH_2—CF_2CF(CF_3)$ at $-44.6$ ppm, b) $BrCF_2CF(CF_3)CF_2$ at $-56$ ppm and c) $Br—CF_2—CF_2CF(CF_3)$ at $-62.8$ ppm. Moreover, the absorption corresponding to $BrCF_2CH_2CF_2Br$ ($-46.3$ ppm) accounted for about 10 mole percent of the telomers. Significantly, there was no absorption in the region of $-137$ to $-145$ ppm where the terminal $Br—CF(CF_3)CF_2$ was expected.

The constitutive units of the cotelomer were identified as d) $CF_2CF(CF_3)$ in the region $-69.7$ to $-76.7$ ppm, e) $CH_2—CF_2CH_2$ in the region of $-88.8$ to $-91.3$ ppm, f) $CH_2—CF_2CF_2$ in the region of $-11.0$ to $-120$ ppm and g) $CF_2CF(CF_3)$ in the region of $-177$ to $-185.5$ ppm.

The relative intensity of the NMR integrals corresponding to the terminal and internal groups were used to calculate the average ratio of VDF units:HFP units and the average degree of telomerization VDF units:HFP units =1:1 (i.e., 50 mole percent HFP units in the cotelomer); average degree of telomerization =3.9.

EXAMPLE 2

The procedure of Example 1 was followed, wherein the quantities of $CF_2Br_2$, VDF and HFP employed were 40 mmols, 23 mmols and 122 mmols, respectively (i.e., a molar ratio of approximately 2:1:5). The reaction mixture was irradiated for 6 days to obtain 5.1 g of a colourless liquid cotelomer. This cotelomer was analyzed by $^{19}F$ NMR and exhibited the same terminal and constitutive units as did the cotelomer of Example 1 with the exception that the groups corresponding to $CF_2Br—CH_2CF_2Br$ were present only in trace amount. The calculated average mole ratio of the VDF units:HFP units was 1:1 (i.e ,. 50 mole percent HFP units in the cotelomer) and the average degree of telomerization was about 6.5.

EXAMPLE 3

The procedure of Example 1 was followed, wherein the quantities of $CF_2Br_2$, VDF and HFP used were 50 mmols, 50 mmols and 50 mmols, respectively (i.e., a molar ratio of 1:1:1), to obtain 7.84 g of a colourless liquid cotelomer. This cotelomer was analyzed by 19 F NMR and the calculated average mole ratio of the VDF units:HFP units was 2:1 (i.e. 33 mole percent HFP units in the cotelomer) and the average degree of telomerization was about 6.

EXAMPLE 4

A procedure similar to that used in Example 1 was followed wherein a 200 ml Hastelloy® autoclave was charged with 200 mmols of $CF_2Br_2$, 100 mmols of VDF and 98 mmols of HFP (i.e., a molar ratio of approximately 2:1:1, respectively). Instead of irradiating the reactants with gamma-rays, the autoclave was heated at $225°$ C. for 90 hours to induce telomerization. This reaction provided 16.5 g of a brown liquid cotelomer mixture having a calculated average mole ratio of the VDF units:HFP units of 1:1 (i.e., 50 mole percent HFP units in the cotelomer) and an average degree of telomerization was about 2.8.

EXAMPLE 5

The telogen 1,1-dibromotetrafluoroethane was prepared according to the procedure described by Piccardi et al. in J. Chem. Soc., Perkin Trans. I, (1972) page 1146. Sixty mmols of this telogen was combined with 30 mmols of VDF and 30 mmols of HFP to prepare cotelomer according to the method of Example 2 (i.e., a molar ratio of 2:1:1, respectively). This reaction mixture was irradiated for 5 days to provide 5.7 g of a colourless liquid cotelomer which was analyzed by 19 F NMR. The calculated average mole ratio of VDF units:HFP units was 1.6:1 (i.e., 38 mole percent HFP units in the cotelomer) and the average degree of telomerization was about 4.3.

EXAMPLE 6

The procedure of Example 5 was followed, wherein the quantities of 1,1-dibromotetrafluoroethane, VDF and HFP used were 50 mmols, 10 mmols and 10 mmols, respectively (i.e., a molar ratio of 5:1:1). This reaction mixture was irradiated for 5 days to provide 1.9 g of a colourless liquid cotelomer. This cotelomer was analyzed by $^{19}F$ NMR and the calculated average mole ratio of the VDF units:HFP units was 1.3:1 (i.e., 43 mole percent HFP units in the cotelomer) and the average degree of telomerization was about 2.4.

EXAMPLE 7

The procedure of Example 2 was followed, wherein the $CF_2Br_2$, VDF and HFP were used in a molar ratio of 1:1:5, respectively. This combination was irradiated for 4 days to provide a cotelomer which had a calculated average mole ratio of the VDF units:HFP units of 1:1 (i.e., 50 mole percent HFP units in the cotelomer) and an average degree of telomerization of about 6.

COMPARATIVE EXAMPLE 1

A procedure similar to that used in Example 1 was followed wherein the telogen $CF_3CBr_3$ was used instead of the telogen $CF_2Br_2$. The molar ratio of $CF_3CBr_3$: VDF:HFP reactants was again 2:1:1. No cotelomer containing both VDF and HFP units resulted but only a mixture of adduct telogen to VDF, having the structures $CF_3CBr_2CH_2CF_2Br$ and $CF_3CBr_2CF_2CH_2Br$, was obtained.

Similarly, no reaction occurred when either $CF_3CBr_3$ or 1,1-dibromotetrafluoroethane telogens were combined with only HFP and irradiated with gamma-rays at room temperature.

COMPARATIVE EXAMPLE 2

Attempts were made to form telomers with chlorotrifluoroethene and cotelomers with chlorotrifluoroethene and HFP monomer using the telogens $CF_3CBr_3$, dibromodifluoromethane and 1,1-dibromotetrafluoroethane according to the above described methods. Only polychlorotrifluoroethene was obtained in each case. These experiments again illustrated the difficulty of cotelomerizing HFP monomer with a fluoroolefin monomer to obtain cotelomers having a high proportion of HFP units.

That which is claimed is:

1. A cotelomer of $CH_2CF_2$— (vinylidene fluoride) units and —$CF_2CF(CF_3)$—(hexafluoropropene) units prepared by reacting in a liquid state: (A) a bromine geminal telogen having the general formula $RC(R')Br_2$ wherein R and R' are selected from the group consisting of F and perfluorinated alkyl radicals having 1 to 8 carbon atoms; (B) 1,1-difluoroethene; and (C) hexafluoropropene, the molar ratio of said components (A):(B):(C) being x:1:1 to x:1:5, in which x is 1 to 5, said cotelomer comprising at least 33% hexafluoropropene units based on the total of VDF and HFP units.

2. The cotelomer according to claim 1 wherein the molar ratio of said components (A):(B):(C) is x:1:1 to x:1:5, wherein x is 2 to 5.

3. The cotelomer according to claim 2 wherein the molar ratio of said components (A):(B):(C) is 2:1:1 to 2:1:5.

4. A cotelomer prepared by reacting in a liquid state: (A) a bromine geminal telogen selected from the group consisting of dibromodifluoromethane and 1,1-dibromotetrafluoroethane; (B) 1,1-difluoroethene; and (C) hexafluoropropene, the molar ratio of said components (A):(B):(C) being x:1:1 to x:1:5, in which x is 1 to 5.

5. The cotelomer according to claim 4 wherein the molar ratio of said components (A):(B):(C) is x:1:1 to x:1:5, wherein x is 2 to 5.

6. The cotelomer according to claim 5 wherein the molar ratio of said components (A):(B):(C) is 2:1:1 to 2:1:5.

7. A process for preparing a cotelomer in the liquid state comprising reacting (A) a bromine geminal telogen having the general formula $RC(R')Br_2$ wherein R and R' are selected from the group consisting of F and perfluorinated alkyl radicals having 1 to 8 carbon atoms; (B) 1,1-difluoroethene, and (C) hexafluoropropene, the molar ratio of said components (A):(B):(C) being x:1:1 to x:1:5, in which x is 1 to 5.

8. The process according to claim 7 wherein said reaction is promoted by heating components (A) through (C).

9. The process according to claim 7 wherein said reaction is promoted by the addition of an organic peroxide.

10. The process according to claim 7 wherein said reaction is promoted by gamma-ray radiation.

11. The process according to claim 7 wherein the molar ratio of said components (A):(B):(C) is x:1:1 to x:1:5, wherein x is 2 to 5.

12. The process according to claim 11 wherein the molar ratio of said components (A):(B):(C) is 2:1:1 to 2:1:5.

13. The process according to claim 7 wherein said telogen (A) is selected from the group consisting of dibromodifluoromethane and 1,1-dibromotetrafluoroethane.

14. The process according to claim 13 wherein the molar ratio of said components (A):(B):(C) is x:1:1 to x:1:5, wherein x is 2 to 5.

* * * * *